Figure 1:
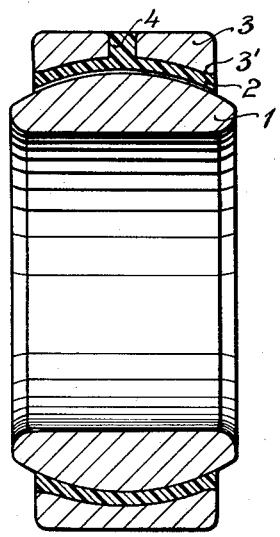

April 12, 1960     A. WITTE     2,932,081

PROCESS FOR MAKING UNIVERSAL JOINT

Filed March 11, 1957

INVENTOR:
ALFRED WITTE

BY

*Karl F. Ross*

AGENT

2,932,081
PROCESS FOR MAKING UNIVERSAL JOINT

Alfred Witte, Bielefeld, Germany, assignor to Durkoppwerke Aktiengesellschaft, Bielefeld, Germany, a corporation of Germany Application March 11, 1957, Serial No. 645,116

Claims priority, application Germany March 31, 1956

2 Claims. (Cl. 29—149.5)

My present invention relates to universal joints having a spherical inner swivel member and an annular outer socket member surrounding the latter with freedom of relative movement.

Universal joints are known wherein the ball-shaped swivel as well as the ring-shaped socket are each made in a single piece, the socket being provided with axial recesses (which should be perpendicular to the load direction) serving to facilitate assembly of the parts. With such joints the machining of the inner bearing surface of the socket member is difficult and expensive. It has also been the practice to make either the swivel or the socket in two parts in order to enable their assembly without the provision of axial mounting recesses in the socket; such joints, however, are necessarily bulkier in construction and less satisfactory in operation than those of the aforementioned type while at the same time also involving certain manufacturing difficulties. Another known solution resides in the introduction of bushings of bearing metal (babbitt) between socket and swivel; here, however, constant and careful lubrication is imperative, especially in mountings subject to large vibrations, if early disintegration of the joint is to be avoided. Finally, there have been proposed universal joints whose outer member or socket is made of resilient synthetic material adapted to be elastically deformed to receive the ball-shaped swivel; although bearings made from such material have the advantage of requiring virtually no maintenance, it has been found practically impossible to form the sockets with the necessary accuracy.

The general object of the present invention is to provide an improved process for making a joint of the character set forth in which the aforementioned disadvantages are avoided.

A more particular object of this invention is to provide a process for making a joint of this description in which the desirable bearing properties of synthetic polymers are utilized to full advantage.

A further object of this invention, allied with the preceding one, is to provide a process for quickly and expeditiously introducing a lining of synthetic material into a socket member to act as a bearing surface for a swivel member.

In accordance with this invention, a metallic annular socket member is formed with an inner, spherically concave surface surrounding a spherically convex swivel member with enough clearance to enable introduction of the latter into the former. Next, this clearance is filled with a synthetic bearing material, such as polyamide or polyurethane resin, to form a lining which surrounds the swivel member without any tolerance. The play necessary to enable free relative movement between swivel and socket is provided by working the swivel member within the resinous lining, which after hardening is positively anchored to the socket member, in such manner as to effect a limited radial enlargement of this lining; this can be conveniently accomplished by exerting a relative axial pressure, alternately in one and in the other direction, upon the two members.

In order that the extent of the internal play may be accurately determined, the socket member is preferably made as a metallic ring whose external diameter is initially less than its design diameter and which is sufficiently deformable so as to yield to the radial forces exerted upon the plastic lining during the widening step. In accordance with another feature of the invention, this ring is placed in a rigid fixture whose inner dimensions correspond to the ultimate outer dimensions of the socket member, the latter being thereupon progressively deformed until it fits closely inside the fixture.

Figure 2:
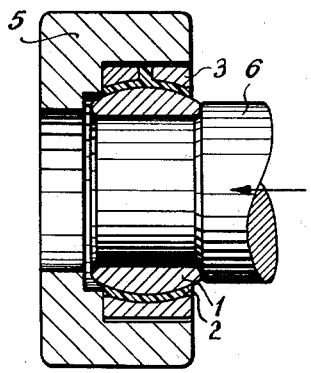
Figure 3:
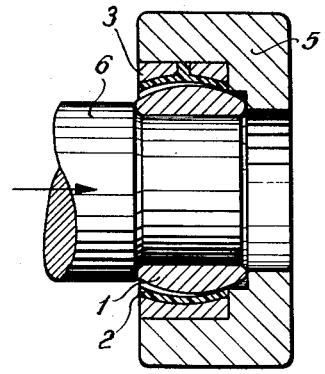

The invention will be described in greater detail with reference to the accompanying drawing in which:

Fig. 1 shows an axial cross-section through a finished joint made by a process according to the invention; and Figs. 2 and 3 are sectional views, similar to that of Fig. 1 but drawn to a smaller scale, of the joint held in a fixture at different stages for formation.

The universal joint shown in the drawing comprises a metallic swivel member 1 having a spherically convex outer surface and a cylindrical bore serving to receive, threadedly or otherwise, a rod or other element (not shown) forming part of a support or a load. Swivel member 1 is surrounded by an annular metallic socket member 3 whose spherically concave inner surface is flared at both ends to form a pair of flat annular shoulders 3'; the inner diameter of these shoulders preferably exceeds only slightly the outer diameter of member 1 so as just to clear that member when the same is inserted into the ring 3.

The ring 3 is provided along its periphery with a series of radial bores 4 (only one shown) through which a suitable plastic bearing material, e.g. a polyamide or a polyurethane, is injected to form a lining 2 between the two metallic members 1, 3 which are concentrically positioned by suitable supports not shown. This lining at first fills completely the space between the two members, as shown in Fig. 2, and should be made as thin as practicable (by suitable limitation of the angle subtended by the curvature of member 3). It will be seen that the lining 2 is firmly anchored to the ring 3 by virtue of the filling bores 4 and the flattened shoulders 3'.

The outer diameter of ring 3 at this stage falls slightly short of the value it is to have in the finished joint. This value corresponds to the inner diameter of a complementary annular cavity in a fixture 5 in which the entire assembly 1, 2, 3 is placed after the layer 2 has hardened. Next, a ram 6 is inserted into the bore of member 1 and with its enlarged shoulder bears upon this member first in one direction, as shown by the arrow in Fig. 1, then (after reversal of the position of unit 1–3 in fixture 5) in the opposite direction, as indicated by the arrow in Fig. 3. As a result of the axial pressure thus exerted, translated into radial forces by the curvature of member 1, the ring 3 with its lining 2 is widened until a desired play between it and member 1 (generally of the order of a few hundredths of a millimeter) is provided, this being determined by the disappearance of the annular clearance of like magnitude between ring 3 and fixture 5. Following its removal from fixture 5, the ring 3 may now be made rigid with a suitable holder therefor, e.g. one similar to this fixture, forming part of the mechanism in which the joint is to be used.

The process hereinabove disclosed has been found to result in universal joints which, when compared with known devices of this character, exhibit superior qualities especially under poor lubricating conditions. In view of its simplicity and limited precision requirements it is particularly, though not exclusively, adapted for the manufacture of joints of very small size.

The invention is, of course, not limited to the specific process and structure described and illustrated but may be embodied in various modifications and adaptations without departing from the spirit and scope of the appended claims.

I claim:

1. A process for forming a ball-and-socket-type universal joint, comprising the steps of shaping a deformable annular socket member with a spherically concave inner surface, axially introducing into said socket member a spherically convex swivel member barely clearing said inner surface whereby an annular space is formed between said members, completely filling said annular space with a layer of plastic bearing material with anchoring of said layer to said socket member, mounting said socket member with limited all-around peripheral clearance in a deformation-resisting holder, and widening the interior of said layer by displacing the swivel member therewithin relatively to the combination of said layer with said socket member to the extent permitted by said peripheral clearance.

2. A process according to claim 1, wherein said layer is formed by casting in said space a material selected from the group which consists of polyamides and polyurethanes.

References Cited in the file of this patent

UNITED STATES PATENTS

| | | |
|---|---|---|
| 1,798,738 | Hoern | Mar. 31, 1931 |
| 1,960,956 | Riedel | May 29, 1934 |
| 2,121,277 | Albrecht | June 21, 1938 |
| 2,252,351 | Paulus | Aug. 12, 1941 |
| 2,476,728 | Heim | July 19, 1949 |
| 2,669,491 | Haller | Feb. 16, 1954 |